United States Patent
Hsu et al.

(10) Patent No.: US 7,912,279 B2
(45) Date of Patent: Mar. 22, 2011

(54) AUTOMATIC WHITE BALANCE STATISTICS COLLECTION

(75) Inventors: De Dzwo Hsu, San Diego, CA (US); Hsiang-Tsun Li, San Diego, CA (US); Szepo Robert Hung, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1182 days.

(21) Appl. No.: 11/553,100

(22) Filed: Oct. 26, 2006

(65) Prior Publication Data

US 2008/0101690 A1    May 1, 2008

(51) Int. Cl.
G06K 9/00 (2006.01)
H04N 1/46 (2006.01)
G06K 9/34 (2006.01)

(52) U.S. Cl. ........................................ 382/162; 358/516

(58) Field of Classification Search .................. 382/118, 382/128, 162, 164, 165, 167, 191, 224, 225, 382/284; 348/68, 222, 223.1, 227, 273, 587; 358/1.9, 3.13, 501, 504, 509, 515, 516, 518; 396/63, 157; 345/552
See application file for complete search history.

(56) References Cited

U.S. PATENT DOCUMENTS

| | | | |
|---|---|---|---|
| 4,965,845 A * | 10/1990 | Chan et al. ..................... | 382/166 |
| 5,767,858 A * | 6/1998 | Kawase et al. ................. | 345/552 |
| 6,788,813 B2 | 9/2004 | Cooper | |
| 6,943,814 B2 * | 9/2005 | Iioka et al. ..................... | 347/131 |
| 7,092,554 B2 * | 8/2006 | Chen et al. ..................... | 382/118 |
| 7,196,724 B2 | 3/2007 | Suzuki et al. | |
| 7,630,545 B2 * | 12/2009 | Cieplinski ...................... | 382/167 |
| 2002/0146168 A1 * | 10/2002 | Lee et al. ....................... | 382/165 |
| 2005/0100212 A1 * | 5/2005 | Eguchi et al. .................. | 382/164 |
| 2005/0111019 A1 * | 5/2005 | Nakauchi et al. .............. | 358/1.9 |
| 2005/0134922 A1 * | 6/2005 | Walmsley et al. ............. | 358/3.13 |
| 2005/0265588 A1 * | 12/2005 | Gholap et al. ................. | 382/128 |
| 2005/0286097 A1 | 12/2005 | Hung et al. | |
| 2008/0101690 A1 * | 5/2008 | Hsu et al. ....................... | 382/162 |

FOREIGN PATENT DOCUMENTS

EP    1311111    5/2003

OTHER PUBLICATIONS

International Search Report—PCT/US2007/082748, International Search Authority—European Patent Office—May 26, 2008.
Written Opinion- PCT/US2007/082748, International Search Authority—European Patent Office—May 26, 2008.

* cited by examiner

*Primary Examiner* — Amir Alavi

(57) ABSTRACT

Automatic white balance of captured images can be performed based on a gray world assumption. One aspect relates to an apparatus comprising a collection module and a processor. The collection module is configured to accumulate (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone. The processor is configured to determine which cluster has a highest accumulated number of pixels, and use the cluster with the highest accumulated number of pixels to perform white balancing for the captured image.

25 Claims, 11 Drawing Sheets

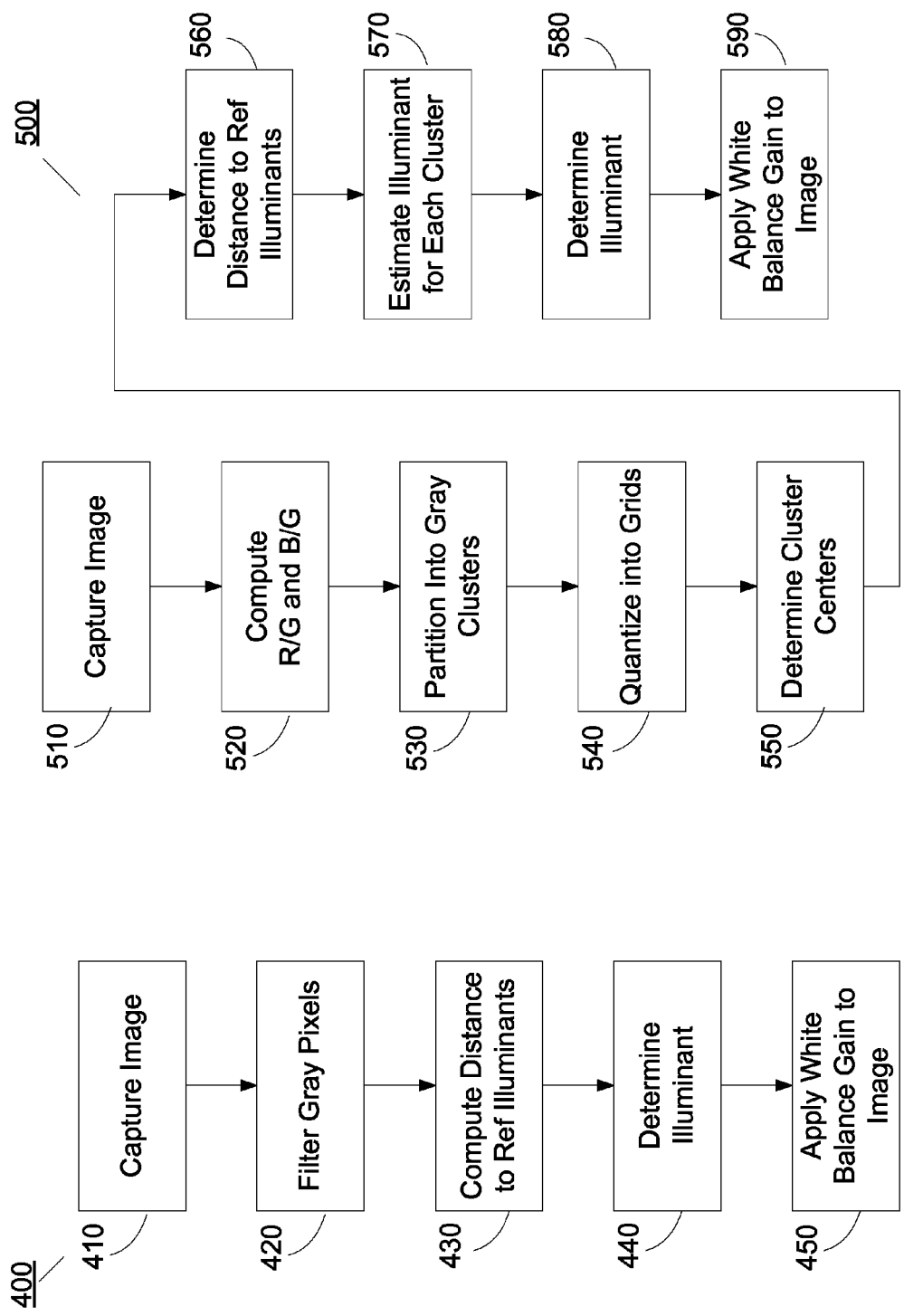

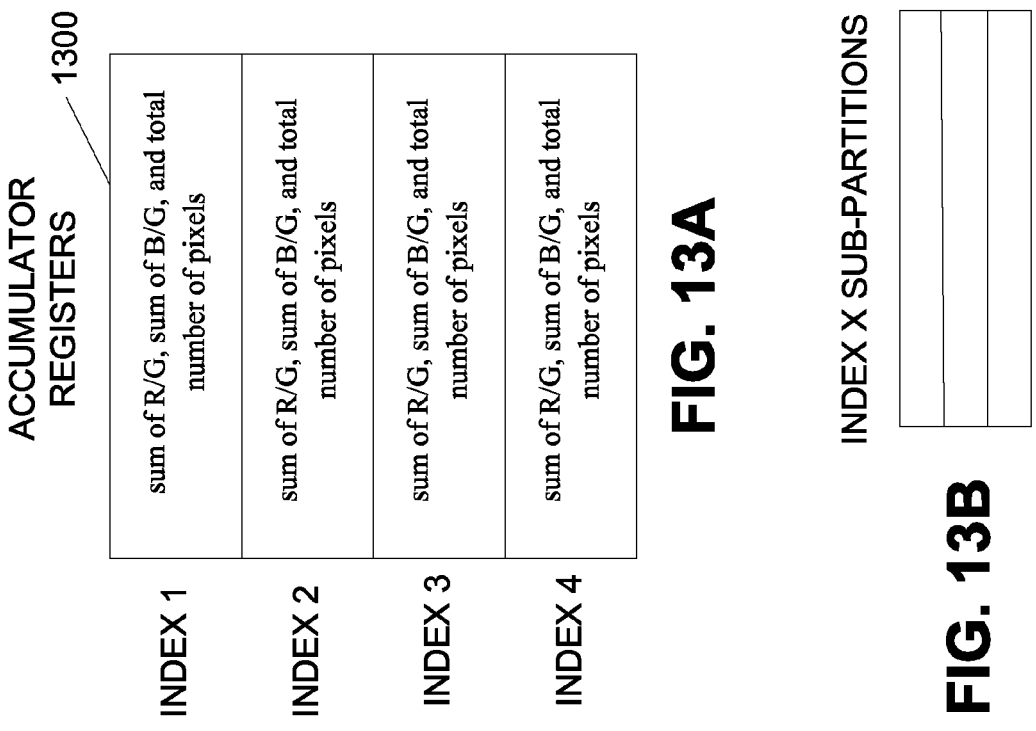
FIG. 13A
FIG. 13B
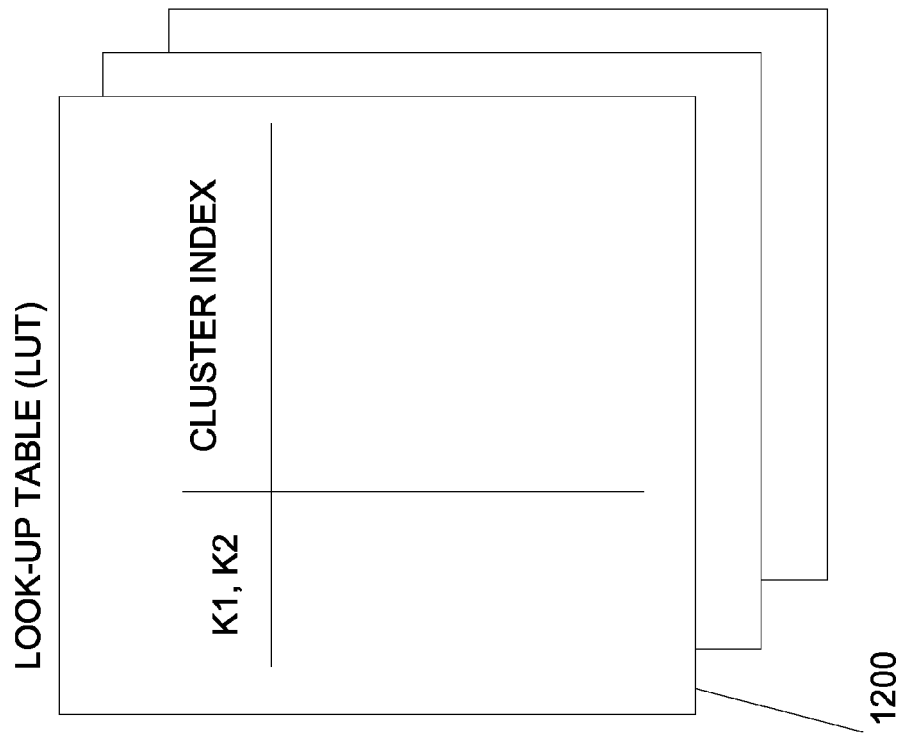
FIG. 12

AUTOMATIC WHITE BALANCE STATISTICS COLLECTION

BACKGROUND

Illumination sources, also referred to as illuminates or illuminants herein, may not be pure white, but instead have a bias towards a particular color. The color bias is usually measured in terms of a color temperature. Human eyes can compensate for illumination that is not pure white, so colors appear relatively consistent over a wide range of lighting conditions. In other words, human eyes can adjust to different lighting conditions so that gray objects appear gray (grey and gray may be used interchangeably herein).

Electronic sensors, however, may perceive the same scene differently when the illuminant changes. Electronic sensors capture images but may be unable to compensate for different lighting conditions having different color temperatures. A typical sensor used in an electronic image capture device, such as a digital camera or video recorder, may capture an image that exhibits a color shift attributable to illumination from a non-pure white source. The color shift exhibited in the captured image may appear unnatural to the human eye and create a perception that the sensor or capture device is of low quality, i.e., unable to accurately capture real world images.

A captured image may be processed to compensate for lighting conditions and color temperature of the illuminant. White balance compensation depends on the color temperature of the illuminant. White balance compensation configured for an illuminant at a first color temperature may not correct for color temperature of a second illuminant, and may further degrade image quality by introducing additional color shift into the image. When color tone in a digital image is off, i.e., no white balancing or incorrect white balancing, human perception of the image may be objectionable.

SUMMARY

An extra light temperature sensor to detect a correct illuminant may be too expensive or heavy to implement on a digital camera or other mobile device. The camera may depend only on pixels captured in each frame to estimate a lighting condition or white level correctly. Auto white balance (AWB) may be an important task for digital imaging applications, such as digital cameras and video recorders. It may be desirable to improve AWB performance.

AWB of captured images can be performed based on a gray world assumption. Initially, a flat field gray image may be captured for one or more reference illuminations. Statistics of the captured gray image are determined and stored for each reference illumination during a calibration process. For each subsequent captured image, the image may be filtered to determine a subset of gray regions. The gray regions may be further partitioned into one or more gray clusters. An average weight of the one or more gray clusters may be determined, and a distance from the average weights to the reference illuminants may be determined. An estimate of the illuminant may be determined based on the distances. White balance gains may be applied to the image based on the estimated illuminant.

Many different types of AWB algorithms may be developed with imperfect performance. Gray world assumption is an inexpensive way to collect statistics data for AWB decision making. There may be different algorithms based on the gray world assumption. When there are no gray pixels in a scene or a frame average is not gray, an algorithm based on gray world assumption can be fooled. Therefore, many heuristics may assist AWB. However, these heuristics are trustworthy only if the collected AWB statistics are reliable.

Since a significant amount of computation processing power in a video application is devoted to encoding and/or decoding images, it is important that an AWB algorithm running on software spends as little time as possible. Otherwise, a frame loss or frame drop situation may occur due to computation power constraint.

A flexible and powerful AWB statistics collection method is described herein. It may be configured for any sensor by using a different set of look-up tables.

One aspect relates to a method comprising (a) computing color ratios from red, green and blue (R,G,B) values for a first pixel; (b) determining if the color ratios are out of a range by comparing the ratios to maximum and minimum values; (c) if the color ratios are out of the range, skipping the first pixel and performing (a) and (b) for a second pixel; (d) if the color ratios are in range, quantizing the color ratios to fixed point integers; (e) looking up the fixed point integers in a table to find a cluster index; (f) determining if the cluster index is zero; (g) if the cluster index is zero, performing (a) and (b) for the second pixel; and (h) if the cluster index is greater than zero, incrementing color ratio sums associated with the cluster index and incrementing a number of pixels associated with the cluster index.

Another aspect relates to a method comprising accumulating (a) red/green and blue/green color ratio values of a plurality of pixels in a captured image for each cluster of a plurality of clusters and (b) a number of pixels having red/green and blue/green color ratios associated with each cluster. The clusters comprise daylight, fluorescent, incandescent, and an outdoor green zone. The method further determines which cluster has a highest accumulated number of pixels, and uses the cluster with the highest accumulated number of pixels to perform white balancing for the captured image.

Another aspect relates to an apparatus comprising: (a) means for computing color ratios from red, green and blue (R,G,B) values for a first pixel; (b) means for determining if the color ratios are out of a range by comparing the ratios to maximum and minimum values; (c) if the color ratios are out of the range, means for skipping the first pixel and performing (a) and (b) for a second pixel; (d) if the color ratios are in range, means for quantizing the color ratios to fixed point integers; (e) means for looking up the fixed point integers in a table to find a cluster index; (f) means for determining if the cluster index is zero; (g) if the cluster index is zero, means for performing (a) and (b) for the second pixel; and (h) if the cluster index is greater than zero, means for incrementing color ratio sums associated with the cluster index and incrementing a number of pixels associated with the cluster index.

Another aspect relates to an apparatus comprising a collection module and a processor. The collection module is configured to accumulate (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone. The processor is configured to determine which cluster has a highest accumulated number of pixels, and use the cluster with the highest accumulated number of pixels to perform white balancing for the captured image.

Another aspect relates to computer-readable medium configured to store a set of instructions executable to: accumulate (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone; and determine which cluster has a highest accumulated number of pixels, and use the cluster with the highest accumulated number of pixels to perform white balancing for the captured image.

BRIEF DESCRIPTION OF THE DRAWINGS

FIG. 4 illustrates a configuration of a method to provide automatic white balance.

FIG. 5 illustrates another configuration of a method to provide automatic white balance.

FIG. 12 illustrates examples of one or more look-up tables that may be used by the method of FIG. 9.

FIG. 13A illustrates accumulator registers for the cluster indices of FIG. 12.

FIG. 13B illustrates registers for an index X with sub-partitions.

DETAILED DESCRIPTION

Gray world assumption can form the basis for performing white balance in digital photography. It has been observed among a large collection of photos that the average color of pixels in an image is roughly gray. Although there are exceptions depending on the scene, the gray world assumption may work well and offer a reliable basis for performing white balance. An automatic white balance (AWB) method and apparatus disclosed herein are based on the gray world assumption combined with an outlier removal. A digital camera or some other image processing device (and/or image capture device) can be configured to perform the AWB methods described herein.

The methods are described with reference to an image capture device, such as a digital camera or wireless camera phone. However, there is no requirement that an image capture sensor be implemented within the device. An electronic device can be configured to perform the AWB method on images captured by a remote sensor.

The image capture device can initially divide the image into a number of regions (one or more pixels). The device can filter the image to pass gray regions and to reject non-gray regions. The device may use the gray regions to determine the illuminant and not rely on the non-gray regions. As used herein, "gray region" and "gray pixel" refer to gray and near-gray regions and pixels, respectively, which are selected by the filter constraints and used in determining the illuminant.

After filtering the image to identify the gray regions, the device transforms or otherwise converts the color characteristics of the gray regions to map onto a predetermined coordinate space or grid. The device can locate one or more reference points within the grid corresponding to a gray reference obtained by capturing a gray image illuminated with a particular illuminant. Therefore, the device can locate a reference point for each illuminant on the grid.

After converting the gray regions to map onto the coordinate system, the device can determine, for each of the gray regions, a distance from the gray region to each of the illuminant reference points. The device can filter the gray regions by determining poor statistical gray regions and removing those outlier regions from consideration. The device can determine, for example, a minimum distance from each of the regions to any of the illuminant reference points. The device can then compare the minimum distance against a predetermined threshold and eliminate from further processing those regions having minimum distances greater than the predetermined thresholds.

The device then compares the distances from the remaining gray regions to each of the illuminant reference points. The device can estimate the illuminant as the illuminant having the illuminant reference point nearest the gray regions.

Figure 1:
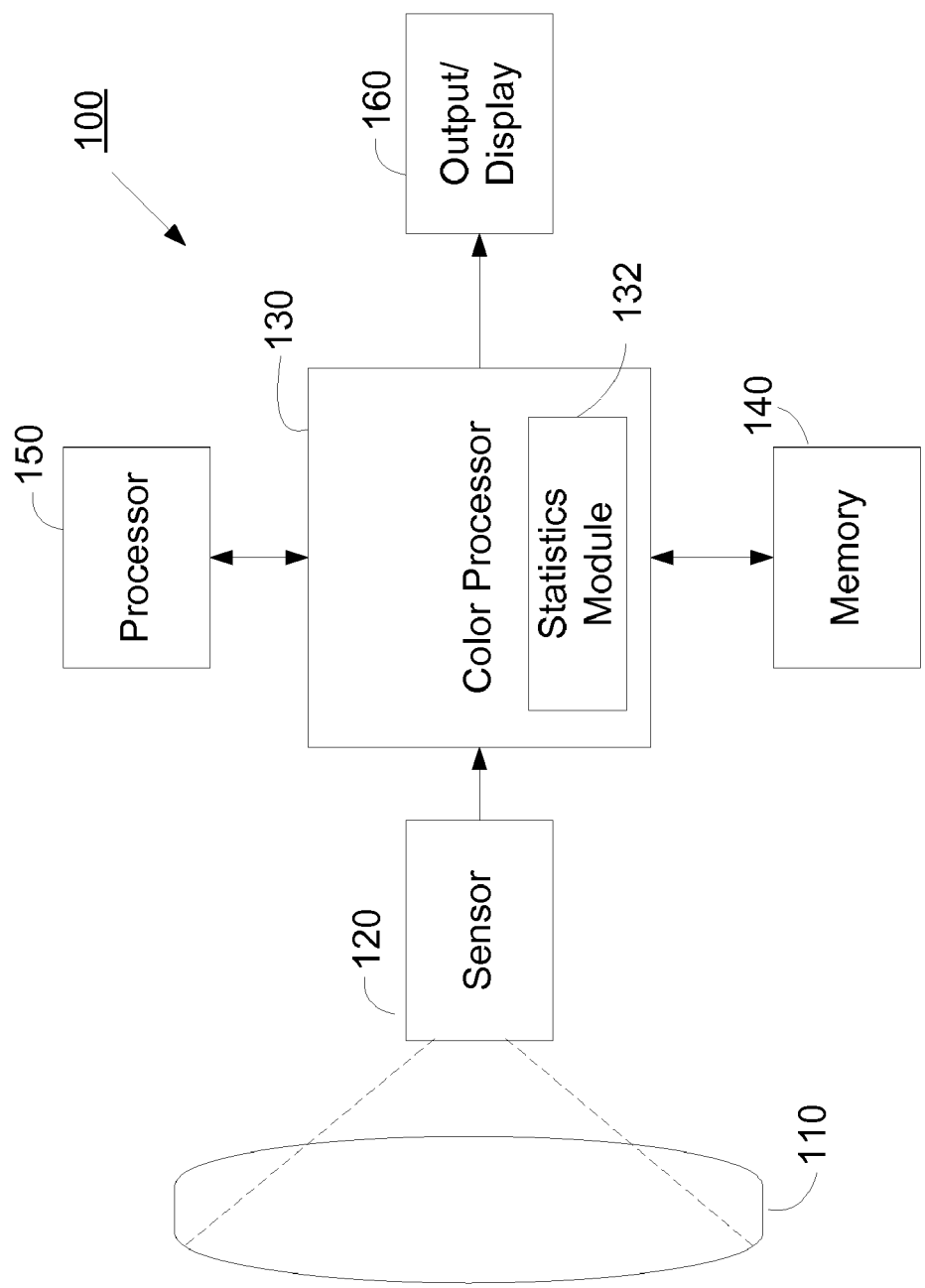
FIG. 1 illustrates a configuration of an image capture device having automatic white balance.

FIG. 1 is a functional block diagram of an image capture device 100 implementing AWB. The image capture device 100 can be, for example, a digital camera, a digital video recorder, a wireless phone having a digital camera, or some other image capture device. The image capture device 100 can include a lens 110 positioned relative to a sensor 120, which may be, for example, an optical sensor configured to convert incident light into electronic representations. For example, the sensor can be a charge coupled device (CCD), a complementary metal oxide semiconductor (CMOS) detector, a photodiode array, a photovoltaic detector, and the like, or some other sensor for capturing an optical image. The sensor 120 can be configured to generate the electronic representation in the form of light components. For example, the sensor 110 may generate distinct R, G, and B representations for the captured image. The sensor 120 may be coupled to a color processor 130.

The color processor 130 may be configured to provide AWB. The color processor 130 can include a statistics module 132 configured to gather and process statistics of captured images. The color processor 130 and the statistics module 132 can be configured to measure or otherwise determine lighting conditions illuminating the scene captured in the image. The color processor 130 can determine an illuminant based in part on statistics stored for a plurality of reference illuminants. The color processor 130 can be configured to apply a correction to the captured image to correct color balance of the image. The color processor 130 and statistics module 132 can be configured to perform some or all of the associated functions using a processor 150 operating in conjunction with a memory 140. Some or all of the functions of the color processor 130 and statistics module 132 can be stored as software in the memory 140 as one or more processor usable instructions. The processor 150 can be configured to access the processor usable instructions and operate on them to perform an associated function.

The color processor 130 can be configured to store reference illuminant statistics and information in a memory 140 and may also be configured to store the captured images or the AWB corrected images in the memory 140. The memory 140 may be internal or external to the device 100. Alternatively, or additionally, the color processor 130 can be configured to communicate the raw or AWB corrected image to an output/display 160.

The output/display 160 can include a display device, such as a liquid crystal display (LCD), a light emitting diode (LED) array, a cathode ray tube (CRT), and the like, or some other display device. The output/display 160 can also include one or more output ports. For example, the AWB corrected images can be output to a port or connector. The color processor 130 can be configured to output the AWB corrected image directly to the output/display 160 or may be configured to convert the AWB corrected image to a particular format, such as a standard display or file format prior to communicating the corrected image to the output/display 160. For example, the color processor 130 can be configured to format the AWB corrected image to a JPEG, GIF, or some other image format. The output/display 160 may be a communication device, such as a modem or wireless transceiver configured to transmit the AWB corrected image to a destination device (not shown).

Figure 2:
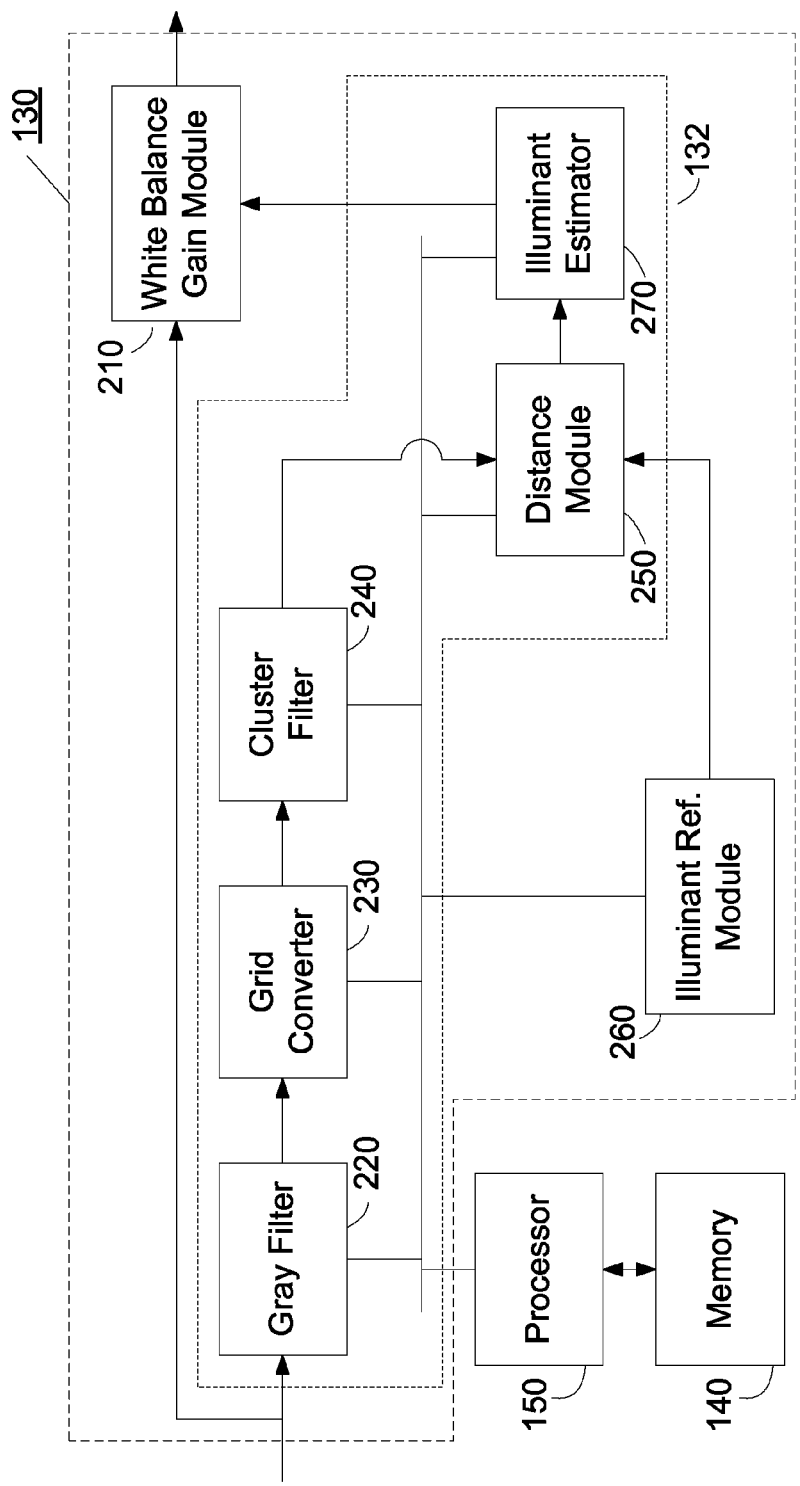
FIG. 2 illustrates a configuration of an image processor configured for automatic white balance.

FIG. 2 is a functional block diagram of a color processor 130 and statistics module 132 operating in an image capture device, such as the image capture device 100 of FIG. 1. As in FIG. 1, the image capture device of FIG. 2 can include a color processor 130 having a statistics module 132 coupled to a processor 150 and memory 140.

The color processor 130 can include an input configured to receive a captured image. The captured image can be input to the statistics module 132 and to a white balance gain module 210. The white balance gain module 210 can be configured to apply white balance gains according to an output of the statistics module 132.

The statistics module 132 can be configured to input the captured image to a gray filter 220, which may process the captured image to select gray objects that can be used to determine an illuminant. Because the captured image is typically in the form of digital signals, packets or a digital file, it may be advantageous to implement the gray filter 220 (e.g., a digital filter) as a digital processor.

A sensor, such as the sensor 120 of FIG. 1, can be configured to capture the image in any one of a variety of color formats, such as red, green, blue (RGB), YCrCb, or some other color format. Each pixel may come in with (R, G, B) triplet values. Then the (R, G, B) values are converted into (Y, Cb, Cr) values.

The gray filter 220 can be configured to process a particular color format to facilitate gray object filtering. For example, the gray filter 220 can be configured to perform initial gray filtering of images in a YCrCb format to facilitate the filtering process. The gray filter 220 can be configured to transform the captured image to the YCrCb format if the image is not already in the YCrCb format. The Y, Cb, and Cr color format can be derived from RGB color format information using the following color transformation, where Y is luminance defined in Rec. 601 (a public standard that defines how RGB pixels are converted into YCbCr data), Cb is the color difference of B and G, and Cr is the color difference of R and G.

$$\begin{bmatrix} Y \\ Cb \\ Cr \end{bmatrix} = \begin{bmatrix} 0.299 & 0.587 & 0.114 \\ 0 & -1 & 1 \\ 1 & -1 & 0 \end{bmatrix} \times \begin{bmatrix} R \\ G \\ B \end{bmatrix} \quad (1)$$

In one configuration, the gray filter 220 can filter the captured image to select gray regions (same as "gray objects" above) by selecting regions within a predetermined luminance range and then selecting from the remaining regions, those regions that satisfy predetermined Cr and Cb criteria. The gray filter 220 can use the luminance value to remove regions that are too dark or too bright. These regions are excluded due to noise and saturation issues. The gray filter 220 can express the filter as a number of equations, where regions that satisfy the following 6 inequalities are considered as possible gray regions.

$$Y <= Y_{max}, \quad (2)$$

$$Y >= Y_{min}, \quad (3)$$

$$Cb <= m1*Cr + c1, \quad (4)$$

$$Cr >= m2*Cb + c2, \quad (5)$$

$$Cb >= m3*Cr + c3, \quad (6)$$

$$Cr <= m4*Cb + c4. \quad (7)$$

The values m1-m4 and c1-c4 can represent predetermined constants that are selected to ensure the filtered objects accurately represent gray regions while maintaining a sufficiently large range of filtered objects to ensure that an illuminant can be estimated for nearly all captured images. Other equations may be used. In some configurations, the gray filter 220 may apply more than one set of filtering criteria and filter the regions based on the multiple criteria.

If a pixel can pass these 6 inequalities, then it is placed into summation for that region. Each image may be divided into 8×8 or 16×16 regions. In the end, each region reports the sum of (Y, Cb, Cr) and the number of pixels included in summation.

The gray filter 220 can operate on regions of nearly any size. For example, a minimum region size can correspond to a single pixel. Similarly, a maximum region size can correspond to the size of the entire captured image. The gray filter 220 may operate on regions smaller than the captured image size. Typically, the image is divided into a plurality of regions, and the gray filter 220 operates on each of the regions.

An image can be divided to contain L×M rectangular regions, where L and M are positive integers. Then N=L×M represents the total number of regions in an image. In one configuration, the gray filter 220 can divide the captured image into regions of 8×8 or 16×16 pixels. The gray filter 220 can transform the pixels of the captured image for example, from RGB components to YCrCb components. The gray filter 220 can filter the pixels using the above inequalities to select possible gray pixels. To reduce a number of computations for large image sizes, the gray filter 220 can be configured to sub-sample or otherwise decimate the pixels vertically and/or horizontally. For example, in one configuration, the gray filter 220 can be configured to sub-sample the horizontal and vertical pixels by a factor of two for images having 1.3 Megapixels or greater.

The gray filter 220 can then process the filtered pixels to generate statistics for each of the regions. For example, the gray filter 220 can determine a sum of the filtered or constrained Cb, a sum of the filtered or constrained Cr, a sum of the filtered or constrained Y, and a number of pixels selected according to the constraints for sum of Y, Cb and Cr. From the region statistics, the gray filter 220 determines each region's sum of Cb, Cr and Y divided by the number of selected pixels to get an average of Cb (aveCb), Cr, (aveCr) and Y (aveY). The gray filter 220 can then transform the statistics back to RGB components to determine an average of R, G, and B. The average R, G, and B values can be determined from aveY, aveCb and aveCr by the following equation.

$$\begin{bmatrix} aveR \\ aveG \\ aveB \end{bmatrix} \equiv \begin{bmatrix} 1.000 & -0.114 & 0.701 \\ 1.000 & -0.114 & -0.299 \\ 1.000 & 0.886 & -0.299 \end{bmatrix} \times \begin{bmatrix} aveY \\ aveCb \\ aveCr \end{bmatrix} \quad (8)$$

Figure 6:
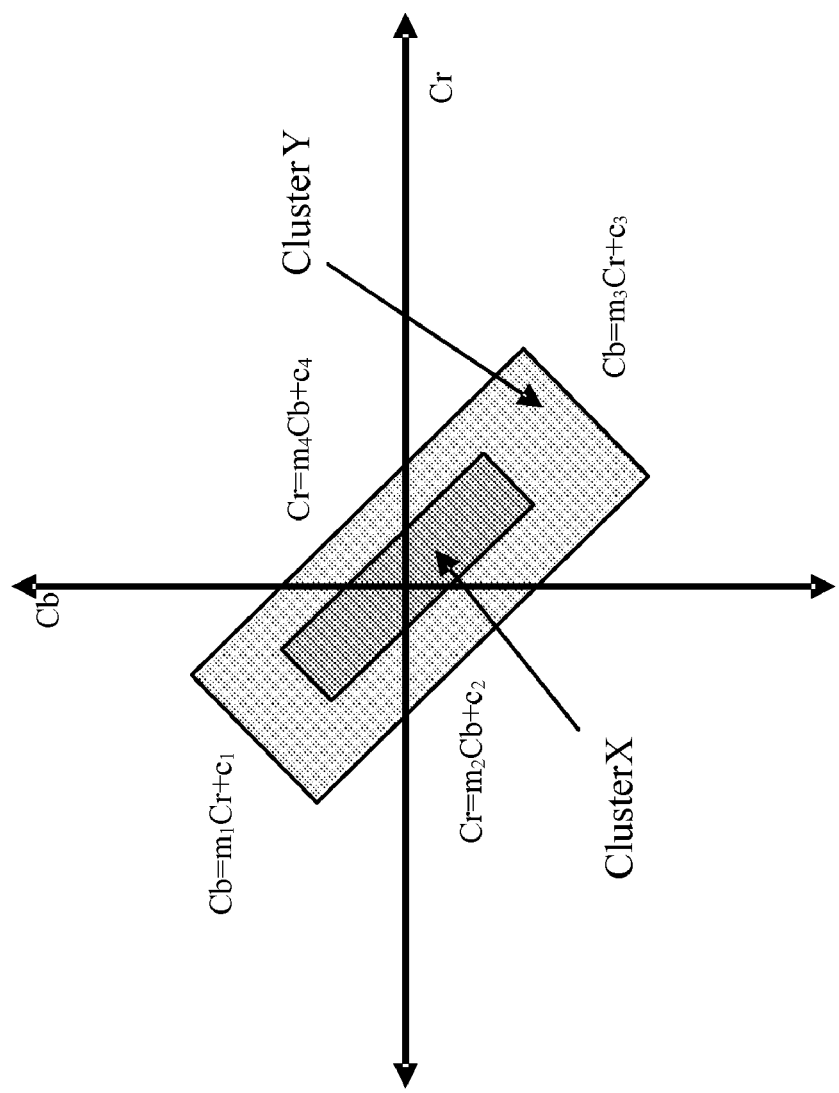
FIG. 6 illustrates an example of a gray filtering configuration.

The gray filter 220 can use the four CbCr constraints (equations (3) through (6) above) to group each region into one of two different clusters: Cluster X for gray regions, and Cluster Y for higher saturation regions, as shown in FIG. 6. The gray regions of Cluster X may provide more reliable illumination estimation than the more saturated regions of Cluster Y. However, the regions in both clusters may be used to maintain a reasonable confidence that a proper illuminant can be estimated in case the number of gray regions is not sufficient to make an accurate estimate.

In one configuration, the intersection of the two axis in FIG. 6 may be considered a gray point, and cluster X and/or cluster Y may be considered a neutral area (near gray). Cluster X and/or cluster Y may be considered a bounding box on the Cr-Cb space for collecting near gray pixels.

The gray filter 220 in FIG. 2 communicates the identity of the regions and their statistics to a grid converter 230. The grid converter 230 is configured to transform the region statistics to a grid coordinate system to determine a relationship to reference illuminants formatted for the coordinate system. In one configuration, the grid converter 230 converts and quantizes the region statistics into one of n×n grids in an (R/G, B/G) coordinate system. The grid distance need not be partitioned linearly. For example, a coordinate grid can be formed from non-linear partitioned R/G and B/G axes. Non-linear partitioned grid coordinates may perform better than a linearly partitioned grid when determining grid distance. The grid converter 230 can discard pairs of (aveR/aveG, aveB/aveG) that are outside of a predefined range, such as [¼, 4]. The grid converter 230 can advantageously transform the region statistics into a two-dimensional coordinate system. However, the use of a two-dimensional coordinate system is not a limitation, and the grid converter 230 can be configured to use any number of dimensions in the coordinate system. For example, in another configuration, the grid converter 230 can use a three-dimensional coordinate system corresponding to R, G, and B values normalized to some predetermined constant.

The grid converter 230 can be configured to communicate the transformed grid values to a cluster filter 240. The cluster filter 240 can be configured to group the grid values (corresponding to the filtered regions) into the clusters defined in the gray filter 220. For example, the cluster filter 240 can be configured to group the grid values from the grid converter 230 into Cluster X and Cluster Y groups defined by the constraints applied in the gray filter 220. In another configuration, the cluster filter 240 and gray filter 220 can define and group the region statistics into more than two groups.

The cluster filter 240 can be configured to provide the groups of grid values to a distance module 250 based in part on the grouping. For example, in the configuration described above, the grid values corresponding to Cluster X may correspond to better gray region approximations. The cluster filter 240 can be configured to initially communicate to the distance module 250 the grid values corresponding to Cluster X. If the distance module 250 and illuminant estimator 270 are able to determine an illuminant estimate with a high degree of confidence, the cluster filter 240 may omit further processing of the Cluster Y grid values. In another configuration, the cluster filter 240 can be configured to communicate the Cluster X values followed by the Cluster Y values in those configurations where the grid values from both clusters are used to determine an illuminant estimate.

An output from an illuminant reference module 260 can be sent to a second input of the distance module 250. The illuminant reference module 260 can be configured to provide locations of reference illuminants to the distance module 250.

The illuminant reference module 260 can be configured to store statistics for one or more reference illuminants. The statistics for the one or more reference illuminants are predetermined during a calibration routine, which measures the performance of various parts of a camera during a manufacturing process.

A characterization process may not be exactly the same as the calibration routine, but they may be similar. Characterization is related to sensor performance. For example, a characterization process may measure the R/G and B/G of a type of sensor under office light. But the manufacturing process may measure every sensor and record how far the sensor is away from the characterized value. The characterization process may take place off-line for a given sensor module, such as the sensor 120 and lens 110 combination of the image capture device 100 in FIG. 1. Off-line processing occurs during a period that a typical consumer is not using the image capture device 100, and may refer to a period in the manufacturing process. For an outdoor lighting condition, a series of pictures of gray objects corresponding to various times of the day is collected. The pictures can include images captured in direct sun light during different times of the day, cloudy lighting, outdoor in the shade, etc. The R/G and B/G ratios of the gray objects under these lighting conditions are recorded. For an indoor lighting condition, images of gray objects can be captured using warm fluorescent light, cold fluorescent light, incandescent light and the like, or some other illuminant. Each of the lighting conditions may be used as a reference point. The R/G and B/G ratios are recorded for indoor lighting conditions.

Figure 7:
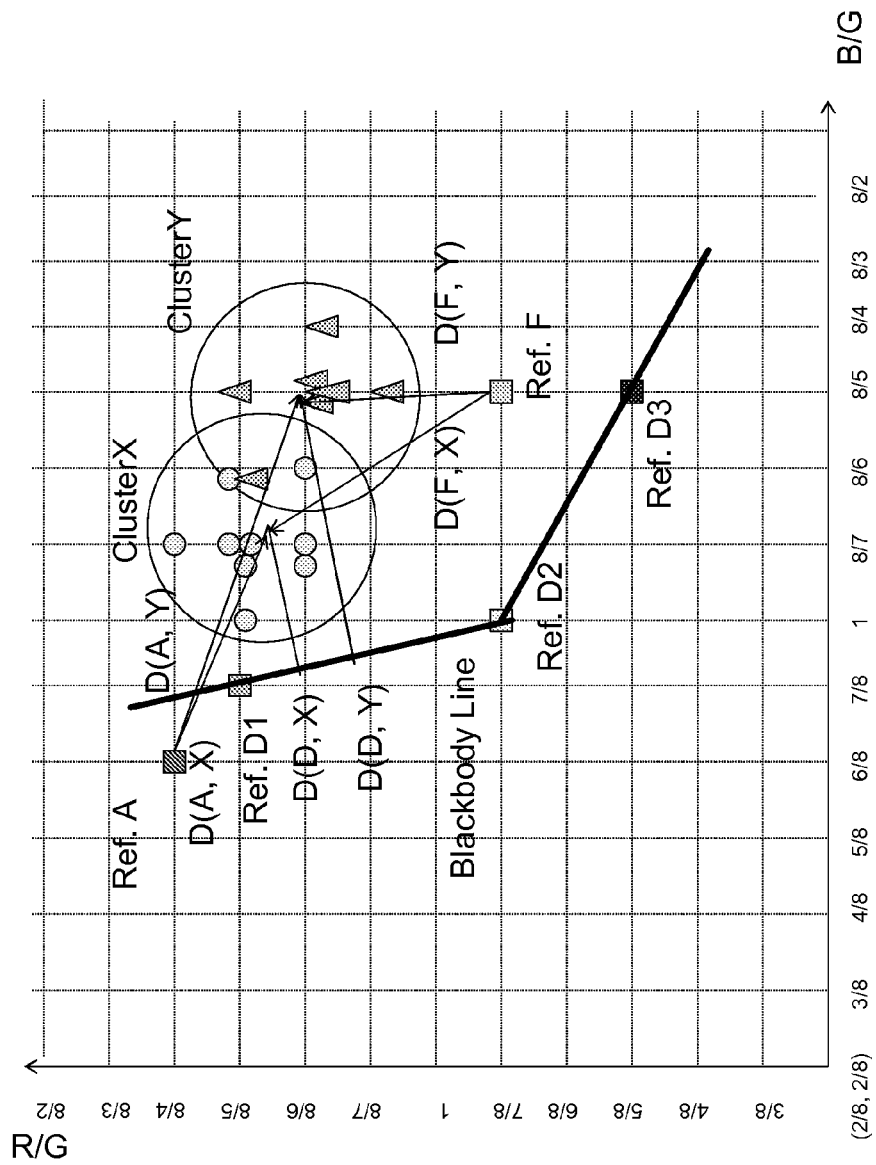
FIG. 7 illustrates an example of determining distances between gray clusters and reference illuminants.

In another configuration, the reference illuminants can include A (incandescent, tungsten, etc.), F (florescent), and multiple daylight illuminants referred to as D30, D50, and D70. The three daylight illuminant can form an approximated blackbody line by interpolation, as shown in FIG. 7. The (R/G, B/G) coordinates of the reference coordinates can be ideally defined by the illuminant colors which are calculated by integrating the sensor modules' spectrum response and the illuminants' power distributions.

After determining the scale of the R/G and B/G ratios, the reference points are located on a grid coordinate. The scale is determined in a way that the grid distance can be used to properly differentiate between different reference points. The illuminant reference module 260 can generate the illuminant statistics using the same coordinate grid used to characterize the gray regions.

The distance module 250 can be configured to determine the distance from each grid point received from the cluster filter 240 to all the reference points from the illuminant reference module 260. The distance module 250 can compare the determined distances against a predetermined threshold. If the shortest distance to any reference point exceeds the predetermined threshold, the point is considered as an outlier and is excluded.

By definition, all the reference points correspond to gray objects under different lighting conditions. If the collected data point received from the cluster filter 240 is not close to any of the reference points, it is not a gray object. If such an outlier point is included in the distance calculation, it will generate a large distance and have a negative impact on the overall distance comparison. Therefore, data points having large minimum distances can be viewed as outliers and removed. If the data point is not an outlier, the distance to all reference points are determined. In one configuration, the distance to a particular reference point can be summed with all other data point distances to that same reference point.

After all the data points are processed such that outliers are removed and the distance to all reference points are summed, there are K numbers which are the sum of distance for all reference points corresponding to K reference points.

The distance module 250 can be configured to (a) communicate each distance to the illuminant estimator 270 or (b) determine the sums and communicate the sum of distances for each of the reference points to the illuminant estimator 270. The illuminant estimator 270 can determine the minimum distance to the reference points and can determine the lighting condition corresponding to the reference point.

In one configuration, the cluster filter 240 is configured to group the image statistics into two groups, labeled Cluster X and Cluster Y. For each data point in both Cluster X and Cluster Y, the distance module 250 can be configured to determine at least three different distances. The distance module 250 can determine, for example, the distance to reference illuminant A (Ref. A), the distance to reference illuminant F (Ref. F), and the distance to a blackbody line formed by reference daylight illuminants, as shown in FIG. 7.

The distance module 250 can be configured to determine distance metrics such as Euclidean, Manhattan (City Block), or some other metric can be used depending on computation complexity requirement and performance requirements. In other configurations, the distance module 250 can be configured to determine a center of gravity corresponding to each of the clusters, and can be configured to determine a distance from the cluster center of gravity to each of the reference illuminant points.

In one configuration, the overall distance to a daylight reference point, D65, can be 125, to a warm fluorescent reference point, WF, can be 324, to a cold fluorescent reference point, CF, can be 421. The illuminant estimator 270 can determine that the distance to D65 (=125) is the smallest among all the numbers. The illuminant estimator 270 can then determine that D65 is the lighting condition, and the corresponding R/G and B/G ratios of D65 are used to perform white balance.

If there is a tie in distances, the illuminant estimator 270 can use the sensor exposure and gain setting to help determine the lighting condition. Depending on the exposure setting, the illuminant estimator 270 can use the exposure and gain settings to decide whether the scene in the captured image is outdoor or indoor and can assist in the AWB decision.

In the rare event that there is no data point that passes the pixel selection process and outlier removal process, the illuminant estimator 270 can use a combination of the exposure setting and overall R/G and B/G ratios to make a decision. If the captured image represents an outdoor scene, the D65 R/G and B/G ratios may be averaged with the overall R/G and B/G ratios as AWB gains. If the captured image corresponds to an indoor scene, the warm fluorescent WF R/G and B/G ratios may be averaged with the overall R/G and B/G ratios as AWB gains. In the event that a flash or strobe is used to illuminate the scene, the R/G and B/G ratios of the flash may be used as white balance gains.

The illuminant estimator 270 can be configured to provide the white balance gains to the white balance gain module 210, where the captured image is corrected for the illuminant. In another configuration, the illuminant estimator 270 can be configured to provide the illuminant estimate to the white balance gain module 210, and the white balance gain module 210 can determine the white balance gains and apply the gains to the captured image.

The white balance (WB) gains for the reference illuminants can be predefined. In one configuration, each reference's WB gain can be defined by the following equation, where row-vector SSr, SSg, and SSb are the sensor module's spectrum response (sensor+IR cut-off+lens), $L_{n \times n}$ is the diagonal matrix of the reference illuminant's power distribution, and $W(R)_{n \times 1}$ is an identity column vector representing a perfect white diffuser.

$$\begin{bmatrix} R_{ref} \\ G_{ref} \\ B_{ref} \end{bmatrix} \equiv \begin{bmatrix} SSr \\ SSg \\ SSb \end{bmatrix}_{3 \times n} \cdot L_{n \times n} \cdot W(R)_{n \times 1} \quad (9)$$

The WB gain can be defined by the following formula.

$$WBgain = \begin{bmatrix} \frac{R_{ref}}{G_{ref}} \\ 1 \\ \frac{B_{ref}}{G_{ref}} \end{bmatrix} \quad (10)$$

If the sensor module's spectrum response is not available, the WB gains may be obtained by averaging raw R, G, and B values of images of a perfect white diffuser under the reference illuminants by the sensor modules. To account for part-to-part variations in sensor modules, multiple units may be characterized, and the responses averaged.

Once the illuminant estimator 270 determines the illuminant, the illuminant estimator 270 or the white balance gain module 210 can define the WB gains as follows. If the estimated illuminant is a particular reference illuminant, for example reference A, the white balance gain module applies the WB gain corresponding to that reference illuminant. If the estimated illuminant is daylight illuminant, the WB gain shall be determined as follows:

If the estimated Correlated Color Temperature (CCT) is between daylight illuminants D1 and D2, then:

$$WBgain = \frac{CCT_{estimated} - CCT_{D1}}{CCT_{D2} - CCT_{D1}} \times WBgain_{D1} + \frac{CCT_{D2} - CCT_{estimated}}{CCT_{D2} - CCT_{D1}} \times WBgain_{D2} \quad (11)$$

If the estimated CCT is between daylight illuminants D2 and D3, then:

$$WBgain = \frac{CCT_{estimated} - CCT_{D2}}{CCT_{D3} - CCT_{D2}} \times WBgain_{D2} + \frac{CCT_{D3} - CCT_{estimated}}{CCT_{D3} - CCT_{D2}} \times WBgain_{D3} \quad (12)$$

To summarize one configuration of the AWB process, the captured image can be gray filtered to select those regions that are likely to be gray regions. The regions can be partitioned into a plurality of clusters. The selected regions are then mapped onto a predetermined coordinate system. The center of gravity of each cluster can be computed within the coordinate system. One or more reference illuminant points can be located within the coordinate system. The distance between each of the centers of gravity of the clusters and each of the reference illuminant points can be determined. The illuminant corresponding to each of the clusters can be estimated, and from the estimates, a final illuminant can be determined. The white balance gains can be determined based on the illuminant and the white balance gains applied to the captured image.

Figure 3:
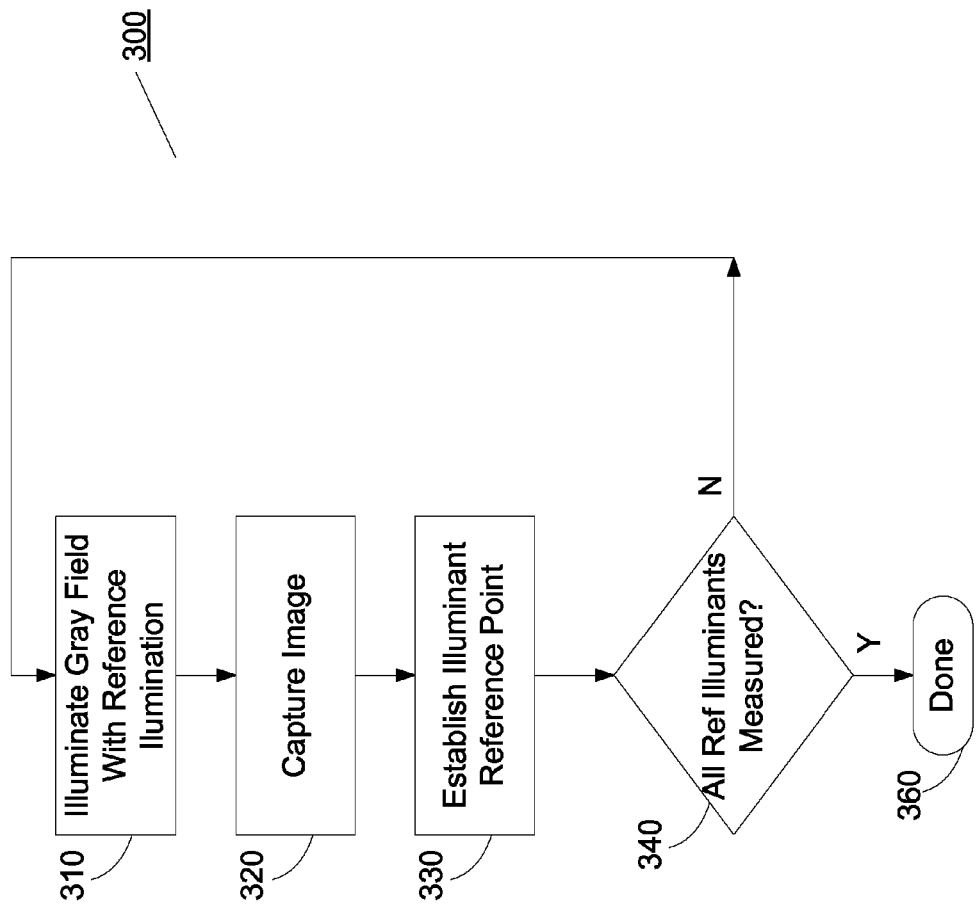
FIG. 3 illustrates a configuration of a method to establish an illuminant reference.

FIG. 3 is a flowchart of a configuration of a method 300 to establish the reference illuminant points stored in the illuminant reference module 260 and used by the distance module 250 of the color processor 130 of FIG. 2. The method 300 can be performed by the color processor 130 of FIG. 2, except illuminating the gray field with a reference illuminant, which may be performed externally.

The method 300 begins at block 310 when a gray field is illuminated with a reference illuminant. The reference illuminant can be, for example, an incandescent source, a halogen source, a tungsten source, a fluorescent source, daylight at particular times of day, or some other light source. The gray field can be a flat field that is uniformly illuminated.

In block 320, the color processor 130 captures the image. In one configuration, the color processor 130 captures the image by controlling a sensor and lens combination. In another configuration, the color processor 130 captures the image by receiving an image captured by a remote sensor.

After capturing the image, the color processor 130 proceeds to block 330 to establish an illuminant reference point corresponding to the captured image. In one configuration, the color processor 130 can determine the R/G and B/G ratios for the pixels of the captured image and determine an average value that represents the reference point for the illuminant.

The color processor 130 then proceeds to decision block 340 to determine if all reference illuminants have been measured. If so, the color processor 130 proceeds to block 360 and is done. If, at decision block 340, the color processor 130 determines that not all illuminants have been measured, the color processor 130 proceeds to back to block 310 to await illumination of the gray field with the next reference illuminant.

FIG. 4 is a flowchart of a configuration of an automatic white balance method 400 that can be performed by the image capture device 100 of FIG. 1. The image capture device 100 can perform the method 400 using the color processor 130 of FIG. 1 or FIG. 2 in combination with the sensor 120 and lens 110 of FIG. 1.

The method 400 begins at block 410 when the image capture device 100 captures an image. The image capture device 100 proceeds to block 420 and filters the gray pixels from the image. The image capture device 100 then proceeds to block 430 and determines the distance to the reference illuminants. The image capture device 100 can determine, for example, the distance from each pixel to each of the reference illuminants, the distance from each of a plurality of regions having the gray pixels to the reference illuminants, a distance from a subset of selected gray pixels to each of the reference illuminants, a distance from one or more centers of gravity corresponding to one or more groupings of gray pixels to each of the reference illuminants, or some other distance.

After determining the distances, the image capture device 100 proceeds to block 440 and determines an illuminant based at least in part on the distances. For example, the image capture device 100 can determine the illuminant based on smallest distance. In another configuration, the image capture device 100 can determine the illuminant based in part on the distances of each of a plurality of clusters to a reference illuminant or an illuminant defined by the reference illuminants.

After determining the illuminant, the image capture device 100 proceeds to block 450 and applies a white balance gain to the captured image. The image capture device 100 can determine the white balance gains based in part on the illuminant.

FIG. 5 is a flowchart of a configuration of an automatic white balance method 500 that can be performed by the image capture device 100 of FIG. 1. Like the automatic white balance method 400 of FIG. 4, the image capture device 100 can perform the method 500 using the color processor 130 of FIG. 1 or FIG. 2 in combination with the sensor 120 and lens 110 of FIG. 1.

The method 500 begins at block 510 where the image capture device 100 captures an image using, for example, a sensor 120 in combination with a lens 110. The sensor 120 can be configured to output the image in R, G, and B components. After capturing the image, the image capture device 100 proceeds to block 520, divides the image into a predetermined number of blocks and computes the ratio of R/G and B/G for each region. The value of R/G and B/G can be, for example, average R/G and B/G values for the pixels within the regions.

After computing the R/G and B/G values, the image capture device 100 proceeds to block 530 and partitions the regions into gray clusters. Those regions that do not correspond to gray regions can be excluded from further processing. The image capture device 100 can, for example, filter the computed R/G and B/G statistics for each of the regions according to predetermined criteria to determine one or more gray regions, such as shown in FIG. 6. The gray regions can be further partitioned into clusters according to further criteria. The criteria for determining the gray clusters can be determined using the same R, G, and B color components provided by the sensor 120, or may be in terms of other color components, such as Y, Cr, and Cb. In some configurations, the image capture device 100 transforms the captured image from one color component format to another.

After partitioning the image statistics into gray clusters, the image capture device 100 can proceed to block 540 and quantize the filtered regions from each of the clusters into a predetermined coordinate system or grid. The coordinate system can be, for example, a two-dimensional coordinate system based on R/G and B/G. The coordinate grid need not be linearly partitioned, and may have non-linearly partitioning, as shown in FIG. 7. FIG. 7 shows an example of a coordinate grid having multiple reference illuminants and gray region data from a captured image grouped according to two clusters.

The image capture device 100 proceeds to block 550 and determines the center of each of the clusters of gray regions. The image capture device 100 can determine, in one configuration, a center of gravity of each of the clusters. In another configuration, the image capture device 100 can determine a center of each cluster using a weighted average of the regions within each cluster.

After determining the center of each of the clusters, the image capture device 100 proceeds to block 560 and determines the distance from each of the cluster centers to each of the reference illuminants. In one configuration, the reference illuminants includes incandescent and tungsten illuminants corresponding to a reference point labeled "A" in FIG. 7, fluorescent illuminants corresponding to a reference point labeled "F" in FIG. 7, and three daylights corresponding to reference points labeled "D30", "D50", and "D70" in FIG. 7. The three daylight illuminants form a blackbody line approximated by interpolation.

The image capture device 100 can be configured to determine a distance from the center of each cluster to the A reference, the F reference, and the nearest point on the blackbody line joining the daylight illuminants.

After determining the distances, the image capture device 100 can proceed to block 570 and estimate the illuminant for each of the clusters. The image capture device 100 can, for example, estimate the illuminant as the illuminant corresponding to the smallest determined distance.

The image capture device 100 can then proceed to block 580 to determine the illuminant based on the estimated illuminant corresponding to each of the clusters. Because the image capture device 100 can estimate an illuminant for more than one cluster, the estimated illuminants may not match. Also, the image capture device 100 may not determine an illuminant if the distances for each of the reference illuminants exceeds a predetermined threshold.

If the estimated illuminants match, the image capture device 100 determines that the illuminant is the estimated illuminant. However, even if all estimated illuminants are to daylight illuminants, the estimated illuminants may correspond to different points on the blackbody line.

If the estimated illuminants are in agreement to be daylight and their Correlated Color Temperature (CCT) difference is within a preset value, the estimated CCT can be the average of the two. If the estimated illuminants are in agreement to be daylight illuminants, and their CCT difference exceeds a preset value, then the estimated CCT may depend on the unconstrained average luminance, Y, to determine daylight brightness, any previous estimation of the same date with known time, and the number of regions in each of the clusters.

If the estimated illuminants are not in agreement, including the condition where one or more of the illuminants are not estimated because of a lack of gray regions in the cluster, then the final estimation may depend on other factors. The factors may include an estimate of possible scenes determined using Cb and Cr histograms derived from the captured image to determine whether the scene is indoor or outdoor. The factors can also include the unconstrained average luminance, Y, which can also be used to determine either indoor or outdoor environment. The factors can also include distances to the multiple different reference illuminants, previous estimations of the same date with known time if they exist, and the number of instants in each of the clusters.

In one configuration, the image capture device 100 can determine the possible scene using template matching or simple if-then logics or expert system, depending on the computational complexity and memory requirement.

After determining the illuminant, the image capture device 100 proceeds to block 590 and applies white balance gains to the captured image. The color components of the captured image can be weighted or otherwise scaled by the white balance gains to achieve a white balanced image.

Methods and apparatus for automatic white balance of images in an image capture device based on a gray world assumption are described. The methods and apparatus can use gray world assumption to determine an illuminant in a captured image from a plurality of reference illuminants. The methods and apparatus can then determine white balance gains to be applied to the captured image to compensate effects of a non-pure white illuminant used to illuminate a scene in a captured image.

New Pixel-Based AWB Statistics Collection Method

Figure 8:
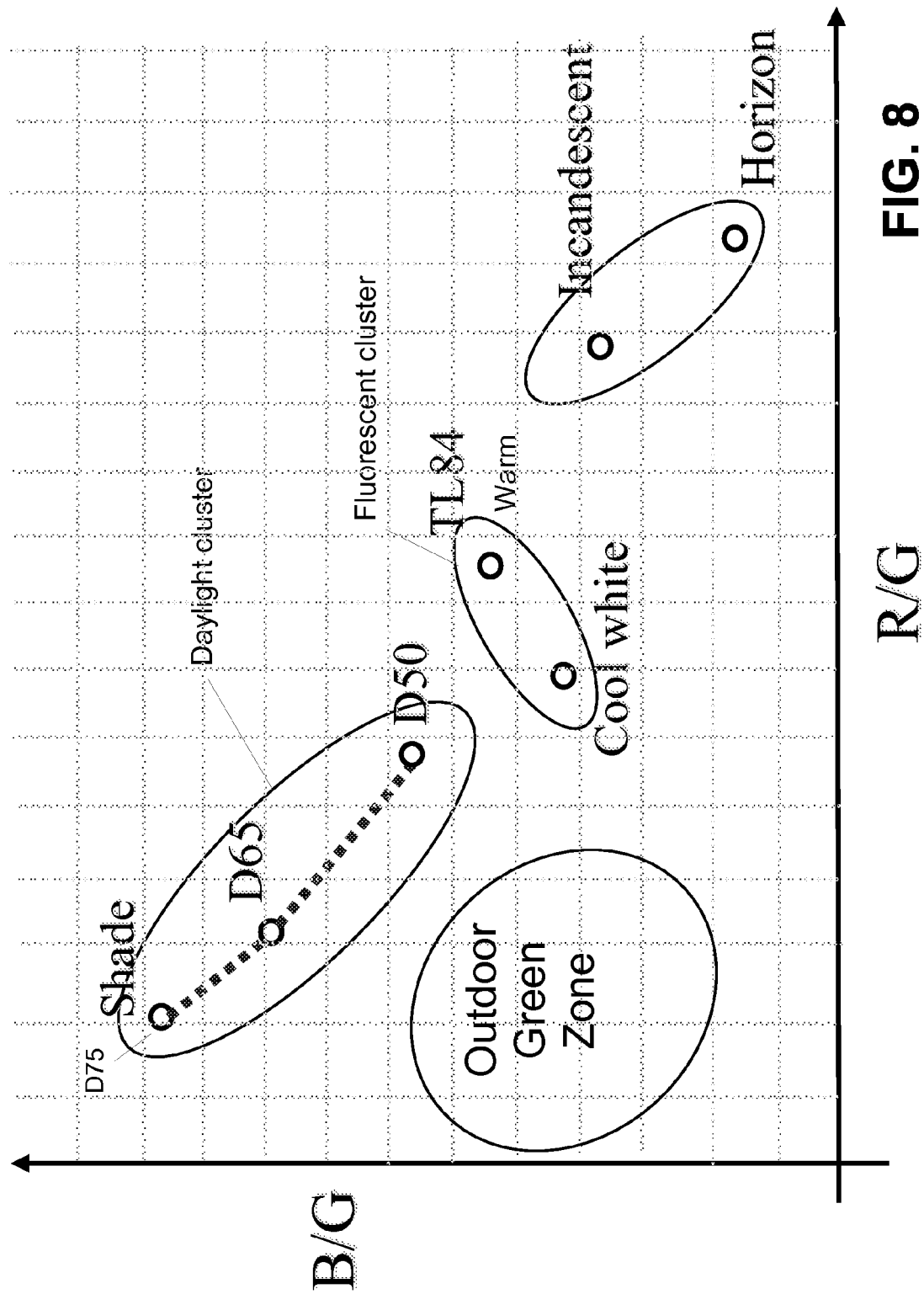
FIG. 8 illustrates a distribution of reference points and outdoor green zone on red/green (R/G) and blue/green (B/G) space.

There may be issues with the region-based statistics collection method described above. First, the (Y, Cb, Cr) space may not be a good color space to perform white balance. Many non-gray colors (such as green) may easily pass through the bounding box (described above with FIG. 6) and be included in the statistics collection method. Another issue is gray samples for two different lighting conditions are also summed together, which may be impossible to differentiate later. For example, D75 light is at the bluest end of a range that the AWB method operates, and Horizon is on the reddest end, as shown in FIG. 8. But the bounding box of FIG. 6 is designed to let near gray pixels pass through for these lights. When the near gray pixels are summed together, they are pulled to the center of the range. Then the AWB decision may be wrong.

Figure 14:
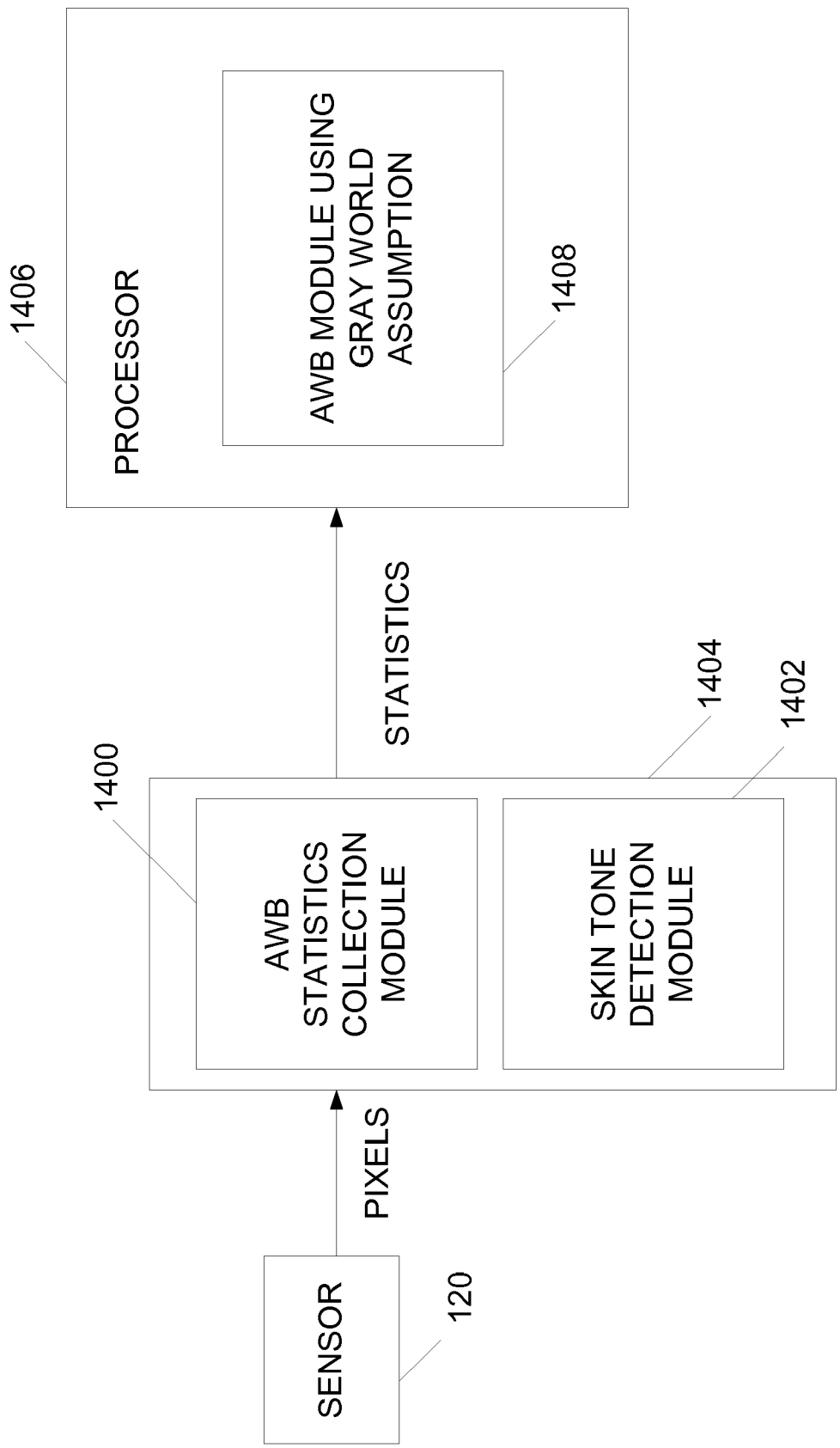
FIG. 14 illustrates a sensor, an AWB statistics collection module, a skin tone detection module, and an AWB module using gray world assumption.

To match an AWB algorithm configured to run on software, a new pixel-based AWB statistics collection method may operate on R/G and B/G space, as shown in FIG. 8, instead of the YCbCr domain. FIG. 8 illustrates a pre-determined distribution of reference points in clusters and outdoor green zone on R/G and B/G space. FIG. 14 illustrates a sensor 120, a pixel-based AWB statistics collection module 1400, a skin tone detection module 1402, and an AWB module 1408 using gray world assumption. The AWB statistics collection module 1400 and skin tone detection module 1402 may be integrated to form one software and/or hardware module 1404. By combing the pixel-based AWB statistics collection module 1400 with the skin tone detection module 1402, hardware may be shared and costs may be reduced.

When each pixel from the sensor 120 comes into the module 1404 of FIG. 14 (or color processor 130 of FIG. 1), the pixel's (R, G, B) triplet values may be turned into (R/G, B/G) duplet values. Then the (R/G, B/G) values may be quantized to fixed point values. To reduce the operating range of (R/G, B/G) based on an actual sensor, a screening equation can be used, as follows:

$$\text{Ratio\_min} \leq R/G \leq \text{Ratio\_max}$$

$$\text{Ratio\_min} \leq B/G \leq \text{Ratio\_max} \qquad (13)$$

For typical sensors such as CMOS and CCD, the Ratio_min may be approximately 0.25, and Ratio_max may be approximately 2.5.

After the (R/G, B/G) values are quantized into a fixed point integer pair (K1, K2), they may be used to look up a gray cluster index in a pre-calibrated, two-dimension (2-D) look-up table (LUT) 1200, as shown in FIG. 12. In one configuration, the allowable ranges may be $$0 \leq \text{quantized } R/G \leq M$$

$$0 \leq \text{quantized } B/G \leq N \qquad (14)$$

Where M and N are positive integers that represent largest values of the allowable R/G and B/G values after quantization. The 2-D LUT 1200 has dimensions of $(M+1) \times (N+1)$. Each value of the 2-D LUT 1200 in FIG. 12 is an index to a cluster in FIG. 8. For example, the daylight cluster (D75, D65, D50) is given the cluster index=1, the fluorescent cluster=2, incandescent cluster=3, outdoor green zone=4, etc. For (R/G, B/G) values that are to be discarded, they are given the index=0. Thus, the 2-D LUT 1200 provides a cluster index for each quantized (R/G, B/G) value.

If the cluster index is non-zero, then a corresponding accumulator register 1300 (FIG. 13) for (R/G, B/G) performs summation, i.e., increments. The number of pixels included for summation is also incremented (counted) in the accumulator register 1300 or in a separate counter. At the end of a frame, each cluster returns 3 values: sum of R/G, sum of B/G, and a total number of pixels included in summation. The AWB module 1408 (e.g., software executed by processor 1406) receives these values, computes average (R/G, B/G) of each cluster, and uses them to make an AWB decision.

If a dominant cluster is found (e.g., the count in a cluster is >75% of the total count in other clusters, for example 3 other clusters), the AWB module 1408 may use the dominant cluster for white balance. If no dominant cluster is found, the AWB module 1408 may use a weight vector to place weightings on cluster average for white balance. The weight vector may be dependent on an exposure index.

Figure 9:
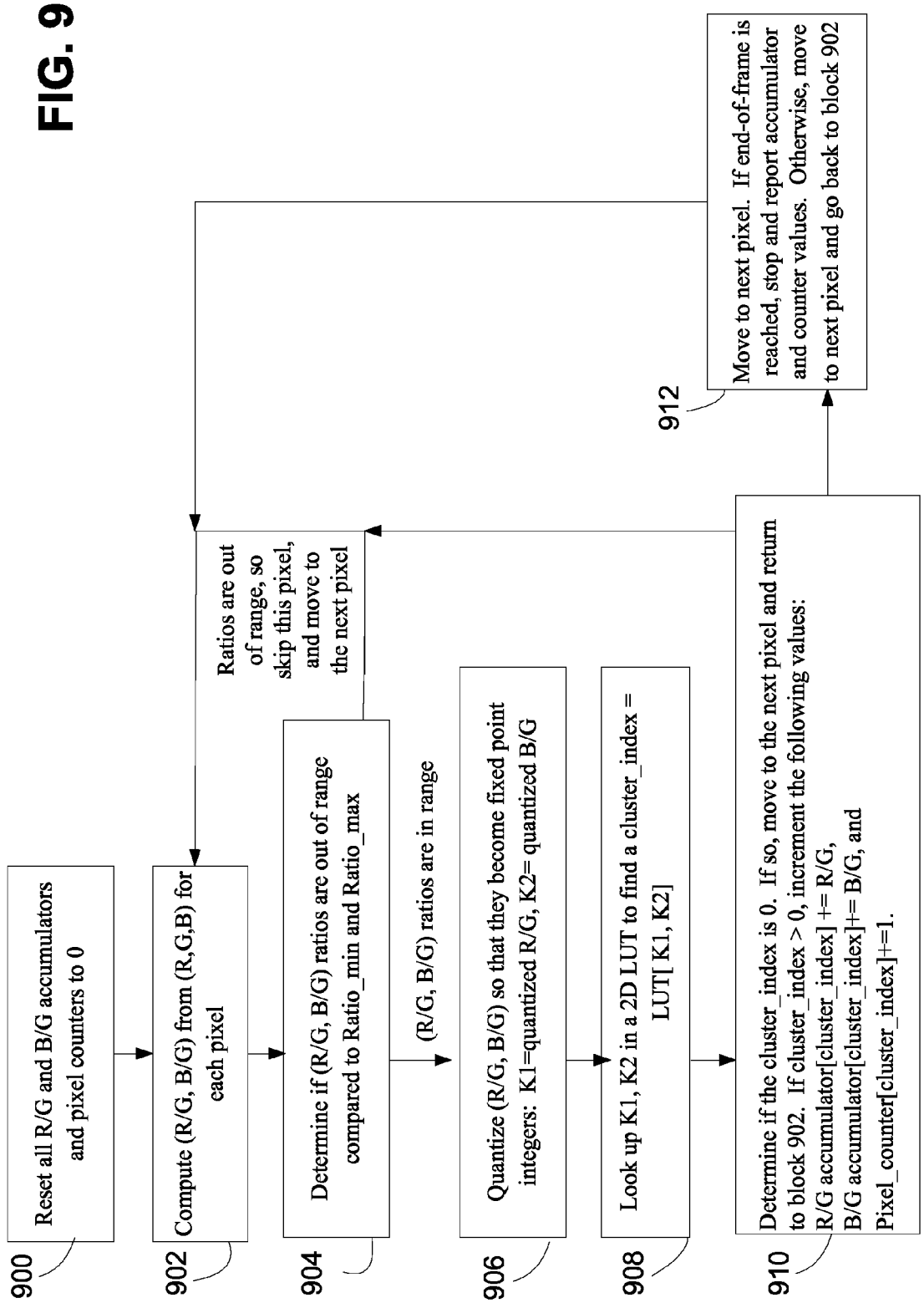
FIG. 9 illustrates an example of another automatic white balancing (AWB) statistics collection method.

FIG. 9 summarizes this pixel-based AWB statistics collection method. In block 900, the method resets all R/G and B/G accumulators 1300 (FIG. 13) and pixel counters to 0.

In block 902, the method computes (R/G, B/G) ratios from (R, G, B) values for each pixel.

In block 904, the method determines if the (R/G, B/G) ratios are out of range compared to Ratio_min and Ratio_max. If so, the method skips this pixel, moves to the next pixel, and goes back to block 902. If the (R/G, B/G) ratios are in range, the method goes to block 906.

In block 906, the method quantizes (R/G, B/G) to become fixed point integers: K1=quantized R/G, K2=quantized B/G.

In block 908, the method looks up K1, K2 in the 2-D LUT 1200 (FIG. 12) to find a cluster_index=LUT[ K1, K2].

In block 910, the method determines if the cluster_index is 0. If so, the method moves to the next pixel and returns to block 902. If cluster_index>0, the method increments the following values in registers 1300:

R/G accumulator[cluster_index]+=R/G,
B/G accumulator[cluster_index]+=B/G, and
Pixel_counter[cluster_index]+=1.

In block 912, the method moves to a next pixel. If end-of-frame is reached, the method stops and reports accumulator and counter values. Otherwise, the method moves to next pixel and goes back to block 902.

The method of FIG. 9 may be implemented in hardware, software or a combination of hardware and software. In another configuration, pixels may be processed in parallel using a method similar to FIG. 9 to save time.

The pixel-based AWB statistics collection method may be more accurate than the first region-based AWB statistics collection method described above, especially when there is hardly any true gray information or too much misleading information in a scene.

The pixel-based AWB statistics collection method may be flexible. The pre-calibrated reference points and clusters (FIG. 8) that the AWB algorithm desires to watch can be programmed in the 2-D LUT 1200. One or more LUTs 1200 can be configured for different sensors. One or more LUTs can be reconfigured at run time if desired. For example, a user can select a setting or the device 100 can sense a low light condition and use larger clusters than the ones shown in FIG. 8. The shape of each cluster in FIG. 8 may be configurable and adjusted. The shapes are not limited to ovals, circles or rectangles.

The pixel-based AWB statistics collection method may provide proper separation of useful statistics data. In the region-based AWB statistics collection method described above with FIGS. 6-7, the colors that resemble outdoor gray and indoor gray are summed together, which makes it difficult for the AWB algorithm to estimate an actual lighting condition. In the new pixel-based AWB statistics collection method, this difficulty is removed.

Figure 10:
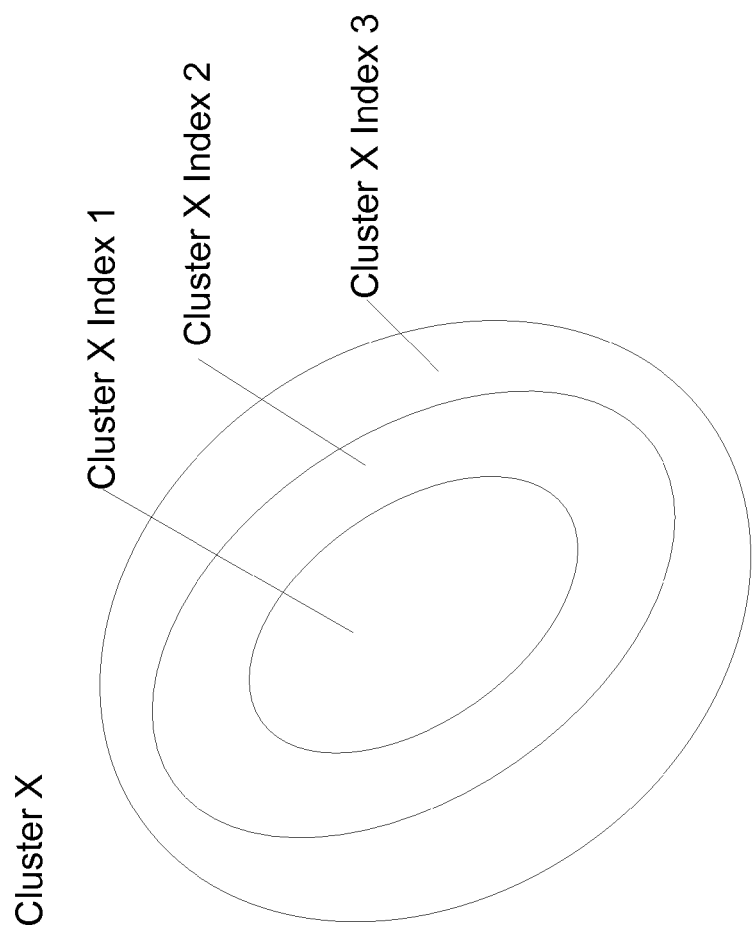
FIG. 10 illustrates different indices assigned to oval sections or partitions of a cluster, which may be used in FIG. 8.

The pixel-based AWB statistics collection method may apply probability weighting. Some AWB algorithms may prefer to place weights on the samples based on a distance to the reference points in FIG. 8. This can be achieved by assigning multiple indices to oval sections or partitions a cluster, i.e., sub-partitioning a cluster, as illustrated in FIG. 10. Pixels that fall into different sections or partitions can be collected (summed) separately in registers as shown in FIG. 13B, which may provide more flexibility. In the AWB algorithm, they can be given different weights.

Figure 11:
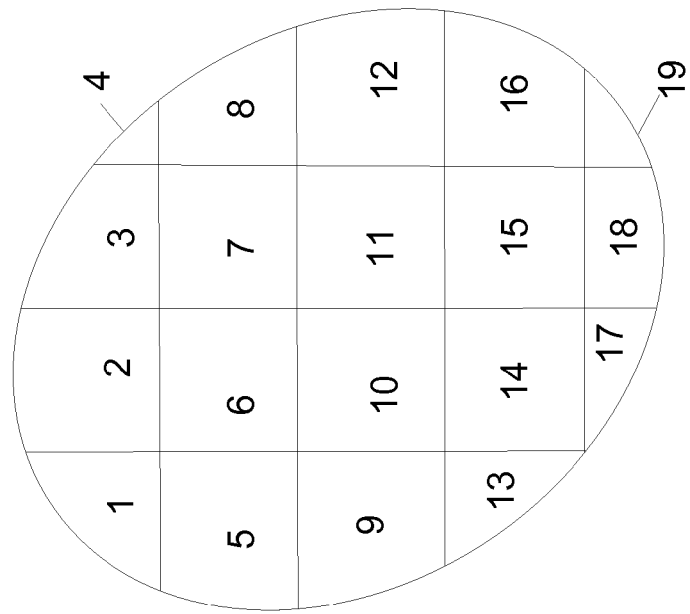
FIG. 11 illustrates an alternative configuration of a cluster, which may be used in FIG. 8, where multiple indices are assigned to substantially rectangular sections in a cluster.

FIG. 11 illustrates another configuration of a cluster that may be used in FIG. 8, where multiple indices are assigned to substantially rectangular sections in a cluster.

The pixel-based AWB statistics collection method may reduce AWB algorithm computation time and save computing power. As mentioned earlier, in camcorder and video telephony applications, a CPU spends a lot of its computation resources on video encoding/decoding. It is desirable that the AWB spends as little time as possible so frame rate does not fluctuate. The pixel-based AWB collection method may match with an AWB algorithm running on a processor 1406 (i.e., provide desired statistics to the processor 1406 and perform at frame rate) and therefore handle most of its time-consuming computation.

The methods described herein may provide better skin tone detections and/or processing for captured images. If there is sufficient gray information, both pixel-based and region-based methods may perform at about the same level or comparable levels in terms of collecting gray information. But the pixel-based method may have a better capability to collect "colored" information such as "green foliage" and "skin tone." The collected skin color and green pixels average can be used to assist AWB decision making. In the region-based method, skin color is averaged with other colors in the same region, so the obtained statistics may not be used to reliably estimate the existence of skin color in the image. The same is true for the green foliage in the region-based method.

In one configuration, after an AWB decision has been made (by the AWB statistics collection module 1400, AWB module 1408 or some other module), a skin tone area on the R/G-B/G space may be defined accordingly. It may not be used in a reverse way. Since skin tone color is normally located in the gray zone of a warmer light, it may be un-differentiable just by looking at the statistics. After an AWB decision has been made, the skin tone detection module 1402 (or some other module) may look at the corresponding skin tone zone of that illuminant and apply "skin color adjustment," "skin-tone based auto exposure control," "skin tone based auto focus control," etc., based on the pixels labeled as skin tone. After the AWB decision has been made and stabilized, the skin color may serve as a secondary adjustment to the AWB decision.

In one configuration of the pixel based method, skin pixels, gray pixels and green pixels are collected separately. The collected green pixel and skin pixel averages may be used to assist decision making.

Green foliage may be important for AWB because green foliage is a dominant color in outdoor images. Many outdoor scenes do not have near gray color and the average is also not close to gray. Therefore, green color gives a very important clue that the scene is outdoors although the collected near-gray information says otherwise.

Although blue sky is also a dominant color for outdoor images, its location on R/G-B/G space causes a misleading decision towards the bluer side, therefore, the images appear too yellow. Thus, the blue color may have less value to assist AWB decision making.

The various illustrative logical blocks, modules, and circuits described in connection with the configurations disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The actions of a method, process, or algorithm described in connection with the configurations disclosed herein may be embodied directly in hardware, in a software module executed by a processor, or in a combination of the two. The various acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed configurations is provided to enable any person of ordinary skill in the art to make or use the disclosure. Various modifications to these configurations will be readily apparent to those of ordinary skill in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. A method comprising using a processor to perform the steps of:
   accumulating (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone;
   determining which cluster has a highest accumulated number of pixels; and
   using the cluster with the highest accumulated number of pixels to perform white balancing for the captured image.

2. The method of claim 1, wherein at least one cluster comprises a plurality of sections associated with different weights.

3. The method of claim 1, further comprising using the accumulated color ratio values associated with the clusters and the accumulated number of pixels associated with the clusters for skin tone processing.

4. The method of claim 1, comprising:
   (a) computing color ratios from red, green and blue (R,G, B) values for a first pixel;
   (b) determining if the color ratios are out of a range by comparing the ratios to maximum and minimum values;
   (c) if the color ratios are out of the range, skipping the first pixel and performing (a) and (b) for a second pixel;
   (d) if the color ratios are in range, quantizing the color ratios to fixed point integers;
   (e) looking up the fixed point integers in a table to find a cluster index;
   (f) determining if the cluster index is zero;
   (g) if the cluster index is zero, performing (a) and (b) for the second pixel; and
   (h) if the cluster index is greater than zero, incrementing color ratio sums associated with the cluster index and incrementing a number of pixels associated with the cluster index.

5. The method of claim 4, further comprising:
   repeating (a) through (h) until all pixels in a frame are processed;
   using the color ratio sums and number of pixels associated with each cluster index of a plurality of cluster indices to perform automatic white balancing for the frame.

6. The method of claim 5, wherein the cluster indices comprise a daylight cluster index, a fluorescent cluster index, an incandescent cluster index, and an outdoor green zone cluster index.

7. An apparatus comprising:
   a collection module configured to accumulate (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone; and
   a processor configured to determine which cluster has a highest accumulated number of pixels, and use the cluster with the highest accumulated number of pixels to perform white balancing for the captured image.

8. The apparatus of claim 7, wherein the collection module is integrated with a skin tone detection module.

9. The apparatus of claim 7, wherein the collection module is executed by the processor.

10. The apparatus of claim 7, wherein the collection module comprises a table of quantized red/green and blue/green color ratio values and cluster indices associated with the color ratio values.

11. The apparatus of claim 7, wherein the collection module comprises a plurality of registers, each register being configured to accumulate color ratio values for one of the plurality of clusters.

12. The apparatus of claim 7, wherein the collection module comprises a plurality of counters, each counter being configured to count a number of pixels having red/green and blue/green color ratios associated with one of the plurality of clusters.

13. The apparatus of claim 7, wherein at least one cluster comprises a plurality of sections associated with different weights, the collection module being configured to accumulate color ratio values and number of pixels separately for each section.

14. A non-transitory computer-readable medium configured to store a set of instructions executable to:

accumulate (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone; and determine which cluster has a highest accumulated number of pixels, and use the cluster with the highest accumulated number of pixels to perform white balancing for the captured image.

15. The computer-readable medium of claim 14, wherein at least one cluster comprises a plurality of sections associated with different weights.

16. The computer-readable medium of claim 14, further comprising using the accumulated color ratio values associated with the clusters and the accumulated number of pixels associated with the clusters for skin tone processing.

17. The computer-readable medium of claim 14, further comprising:
   (a) computing color ratios from red, green and blue (R,G,B) values for a first pixel;
   (b) determining if the color ratios are out of a range by comparing the ratios to maximum and minimum values;
   (c) if the color ratios are out of the range, skipping the first pixel and performing (a) and (b) for a second pixel;
   (d) if the color ratios are in range, quantizing the color ratios to fixed point integers;
   (e) looking up the fixed point integers in a table to find a cluster index;
   (f) determining if the cluster index is zero;
   (g) if the cluster index is zero, performing (a) and (b) for the second pixel; and
   (h) if the cluster index is greater than zero, incrementing color ratio sums associated with the cluster index and incrementing a number of pixels associated with the cluster index.

18. The computer-readable medium of claim 17, further comprising:
   repeating (a) through (h) until all pixels in a frame are processed;
   using the color ratio sums and number of pixels associated with each cluster index of a plurality of cluster indices to perform automatic white balancing for the frame.

19. The computer-readable medium of claim 18, wherein the cluster indices comprise a daylight cluster index, a fluorescent cluster index, an incandescent cluster index, and an outdoor green zone cluster index.

20. An apparatus comprising:
   means for accumulating (a) red/green and blue/green color ratio values of a plurality of pixels in a captured image for each cluster of a plurality of clusters and (b) a number of pixels having red/green and blue/green color ratios associated with each cluster, the clusters comprising daylight, fluorescent, incandescent, and a outdoor green zone;
   means for determining which cluster has a highest accumulated number of pixels; and
   means for using the cluster with the highest accumulated number of pixels to perform white balancing for the captured image.

21. The apparatus of claim 20, wherein at least one cluster comprises a plurality of sections associated with different weights.

22. The apparatus of claim 20, further comprising using the accumulated color ratio values associated with the clusters and the accumulated number of pixels associated with the clusters for skin tone processing.

23. The apparatus of claim 20, further comprising:
   (a) means for computing color ratios from red, green and blue (R,G,B) values for a first pixel;
   (b) means for determining if the color ratios are out of a range by comparing the ratios to maximum and minimum values;
   (c) if the color ratios are out of the range, means for skipping the first pixel and performing (a) and (b) for a second pixel;
   (d) if the color ratios are in range, means for quantizing the color ratios to fixed point integers;
   (e) means for looking up the fixed point integers in a table to find a cluster index;
   (f) means for determining if the cluster index is zero;
   (g) if the cluster index is zero, means for performing (a) and (b) for the second pixel; and
   (h) if the cluster index is greater than zero, means for incrementing color ratio sums associated with the cluster index and means for incrementing a number of pixels associated with the cluster index.

24. The apparatus of claim 23, further comprising:
   means for repeating (a) through (h) until all pixels in a frame are processed;
   means for using the color ratio sums and number of pixels associated with each cluster index of a plurality of cluster indices to perform automatic white balancing for the frame.

25. The apparatus of claim 24, wherein the cluster indices comprise a daylight cluster index, a fluorescent cluster index, an incandescent cluster index, and an outdoor green zone cluster index.

* * * * *